(12) United States Patent
Peng et al.

(10) Patent No.: US 12,346,494 B2
(45) Date of Patent: *Jul. 1, 2025

(54) IMAGE GAZE CORRECTION METHOD, APPARATUS, ELECTRONIC DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Guangdong (CN)

(72) Inventors: Jinlong Peng, Shenzhen (CN); Keke He, Shenzhen (CN); Zhengkai Jiang, Shenzhen (CN); Yang Yi, Shenzhen (CN); Xiaoming Yu, Shenzhen (CN); Juanhui Tu, Shenzhen (CN); Yi Zhou, Shenzhen (CN); Chenghao Liu, Shenzhen (CN); Yabiao Wang, Shenzhen (CN); Ying Tai, Shenzhen (CN); Chengjie Wang, Shenzhen (CN); Jilin Li, Shenzhen (CN); Feiyue Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 90 days.

This patent is subject to a terminal disclaimer.

(21) Appl. No.: 17/977,682

(22) Filed: Oct. 31, 2022

(65) Prior Publication Data
US 2023/0054515 A1    Feb. 23, 2023

Related U.S. Application Data

(63) Continuation of application No. PCT/CN2022/072315, filed on Jan. 17, 2022.

(30) Foreign Application Priority Data

Jan. 22, 2021   (CN) .......................... 202110089871.5

(51) Int. Cl.
*G06V 10/82* (2022.01)
*G06F 3/01* (2006.01)
(Continued)

(52) U.S. Cl.
CPC .............. *G06F 3/013* (2013.01); *G06V 10/25* (2022.01); *G06V 10/46* (2022.01); *G06V 10/751* (2022.01);
(Continued)

(58) Field of Classification Search
CPC ............................. G06V 40/18; G06V 40/193
See application file for complete search history.

(56) References Cited

U.S. PATENT DOCUMENTS

| | | | |
|---|---|---|---|
| 11,360,555 B2* | 6/2022 | Weng | G06T 7/73 |
| 11,783,487 B2* | 10/2023 | Poliakov | G06T 7/62 |
| | | | 382/164 |

(Continued)

FOREIGN PATENT DOCUMENTS

| | | |
|---|---|---|
| CN | 107646112 A | 1/2018 |
| CN | 111008929 A | 4/2020 |

(Continued)

OTHER PUBLICATIONS

International Search Report for PCT/CN2022/072315 dated, Apr. 7, 2022 (PCT/ISA/210).
(Continued)

*Primary Examiner* — Frank Johnson
(74) *Attorney, Agent, or Firm* — Banner & Witcoff, Ltd.

(57) ABSTRACT

An image gaze correction method, apparatus, electronic device, computer-readable storage medium, and computer
(Continued)

program product. The image gaze correction method includes: acquiring a to-be-corrected eye image from a to-be-corrected image, generating, based on the to-be-corrected eye image, an eye motion flow field and an eye contour mask, the eye motion flow field being used for adjusting a pixel position in the to-be-corrected eye image, and the eye contour mask being used for indicating a probability that the pixel position in the to-be-corrected eye image belongs to an eye region, performing, based on the eye motion flow field and the eye contour mask, gaze correction processing on the to-be-corrected eye image to obtain a corrected eye image, and generating a gaze corrected image based on the corrected eye image.

20 Claims, 7 Drawing Sheets

(51) Int. Cl.

| | | |
|---|---|---|
| *G06V 10/25* | (2022.01) | |
| *G06V 10/46* | (2022.01) | |
| *G06V 10/75* | (2022.01) | |
| *G06V 10/771* | (2022.01) | |
| *G06V 10/80* | (2022.01) | |
| *G06V 40/18* | (2022.01) | |

(52) U.S. Cl.
CPC ......... *G06V 10/771* (2022.01); *G06V 10/803* (2022.01); *G06V 40/193* (2022.01)

(56) References Cited

U.S. PATENT DOCUMENTS

| | | | |
|---|---|---|---|
| 2012/0301024 A1* | 11/2012 | Yuan | G06T 7/11 |
| | | | 382/167 |
| 2015/0235355 A1 | 8/2015 | Mullins | |
| 2016/0323540 A1* | 11/2016 | Nilsson | G06V 20/46 |
| 2017/0308734 A1* | 10/2017 | Chalom | G06V 40/193 |
| 2018/0032840 A1* | 2/2018 | Yu | G06V 10/774 |
| 2018/0315165 A1* | 11/2018 | Navarrete Michelini | |
| | | | G06T 3/4046 |
| 2021/0097644 A1* | 4/2021 | Sommerlade | G06T 5/73 |
| 2022/0207667 A1* | 6/2022 | Huang | G06V 40/171 |
| 2023/0083909 A1* | 3/2023 | Haro | G06T 19/20 |
| | | | 345/619 |

FOREIGN PATENT DOCUMENTS

| | | |
|---|---|---|
| CN | 111339928 A | 6/2020 |
| CN | 111353336 A | 6/2020 |
| CN | 111882627 A | 11/2020 |
| CN | 112733795 A | 4/2021 |
| CN | 112733797 A | 4/2021 |

OTHER PUBLICATIONS

Written Opinion of the International Search Report for PCT/CN2022/072315 dated, Apr. 7, 2022 (PCT/ISA/210).

* cited by examiner

Image 51  Image 52

IMAGE GAZE CORRECTION METHOD, APPARATUS, ELECTRONIC DEVICE, COMPUTER-READABLE STORAGE MEDIUM, AND COMPUTER PROGRAM PRODUCT

CROSS-REFERENCE RELATED APPLICATION(S)

This application is a continuation application of International Application No. PCT/CN2022/072315, filed on Jan. 17, 2022, which claims priority to Chinese Patent Application No. 202110089871.5 filed with the China National Intellectual Property Administration on Jan. 22, 2021, the disclosures of which are incorporated by reference in their entireties.

FIELD

The disclosure relates to the field of artificial intelligence technologies, and relates to an image gaze correction method, apparatus, electronic device, computer-readable storage medium, and computer program product.

BACKGROUND

Gaze correction of an image object such as a person and an animal is a typical application of artificial intelligence in graph and image processing, and has various application scenarios.

Generally speaking, in order to achieve gaze correction, a head pose angle is usually estimated first, so as to obtain a head offset direction, and then an included angle between the head offset direction and a gaze of facing a camera is used for estimating a degree of a gaze that needs to be corrected, and correcting an eyeball position according to the degree, thereby achieving the gaze correction.

However, the above process of achieving gaze correction includes sequential calculation of a plurality of parameters, and there will be an error in parameter calculation of each operation. The errors will be accumulated and magnified in the entire gaze correction process, resulting in a low accuracy of the gaze correction.

SUMMARY

The disclosure may provide an image gaze correction method, apparatus, electronic device, computer-readable storage medium, and computer program product, which can improve the accuracy of gaze correction.

An image gaze correction method may be provided in some embodiments, the method is performed by an electronic device, and the method includes: acquiring a to-be-corrected eye image from a to-be-corrected image; generating, based on the to-be-corrected eye image, an eye motion flow field and an eye contour mask, the eye motion flow field being used for adjusting a pixel position in the to-be-corrected eye image, and the eye contour mask being used for indicating a probability that the pixel position in the to-be-corrected eye image belongs to an eye region; performing, based on the eye motion flow field and the eye contour mask, gaze correction processing on the to-be-corrected eye image to obtain a corrected eye image; and generating a gaze corrected image based on the corrected eye image.

A method for training a gaze correction model may be provided in some embodiments, the method is performed by an electronic device, and the method includes: acquiring a training sample of a to-be-trained gaze correction model, the training sample including a to-be-corrected eye image sample and a target corrected eye image; processing, by the to-be-trained gaze correction model, the to-be-corrected eye image sample to obtain an eye motion flow field sample and an eye contour mask sample corresponding to the to-be-corrected eye image sample, the eye motion flow field sample being used for adjusting a pixel position in the to-be-corrected eye image sample, and the eye contour mask sample being used for indicating a probability that the pixel position in the to-be-corrected eye image sample belongs to an eye region; performing, based on the eye motion flow field sample and the eye contour mask sample, gaze correction processing on the to-be-corrected eye image sample to obtain a corrected eye image sample; and determining, based on the corrected eye image sample and the target corrected eye image, a loss of the to-be-trained gaze correction model, and adjusting a parameter of the to-be-trained gaze correction model based on the loss to obtain a gaze correction model.

An image gaze correction apparatus may be provided in some embodiments, and the apparatus includes: an eye image acquisition module configured to acquire a to-be-corrected eye image from a to-be-corrected image; a flow field mask generation module configured to generate, based on the to-be-corrected eye image, an eye motion flow field and an eye contour mask, the eye motion flow field being used for adjusting a pixel position in the to-be-corrected eye image, and the eye contour mask being used for indicating a probability that the pixel position in the to-be-corrected eye image belongs to an eye region; a gaze correction processing module configured to perform, based on the eye motion flow field and the eye contour mask, gaze correction processing on the to-be-corrected eye image to obtain a corrected eye image; and an eye image integration module configured to generate a gaze corrected image based on the corrected eye image.

An apparatus for training a gaze correction model may be provided in some embodiments, and the apparatus includes: a sample acquisition module configured to acquire a training sample of a to-be-trained gaze correction model, the training sample including a to-be-corrected eye image sample and a target corrected eye image; a model processing module configured to process, by the to-be-trained gaze correction model, the to-be-corrected eye image sample to obtain an eye motion flow field sample and an eye contour mask sample corresponding to the to-be-corrected eye image sample, the eye motion flow field sample being used for adjusting a pixel position in the to-be-corrected eye image sample, and the eye contour mask sample being used for indicating a probability that the pixel position in the to-be-corrected eye image sample belongs to an eye region; a gaze correction module configured to perform, based on the eye motion flow field sample and the eye contour mask sample, gaze correction processing on the to-be-corrected eye image sample to obtain a corrected eye image sample; and a parameter adjustment module configured to determine, based on the corrected eye image sample and the target corrected eye image, a loss of the to-be-trained gaze correction model, and adjust a parameter of the to-be-trained gaze correction model based on the loss to obtain a gaze correction model.

Some embodiments may provide an electronic device, the electronic device including a processor and a memory, the memory storing at least one instruction, at least one program, a code set or an instruction set, the at least one instruction, the at least one program, the code set or the instruction set being loaded and executed by the processor to implement the foregoing embodiments.

Some embodiments may provide a non-transitory computer-readable storage medium, the computer-readable storage medium storing at least one instruction, at least one program, a code set or an instruction set, and the at least one instruction, the at least one program, the code set or the instruction set being loaded and executed by a processor, to implement the foregoing embodiments.

Some embodiments may provide a computer program product or a computer program, the computer program product or the computer program including computer instructions, the computer instructions being stored in a computer-readable storage medium. A processor of an electronic device reads the computer instructions from the computer-readable storage medium, and the processor executes the computer instructions, to cause the computer device to perform the foregoing embodiments.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
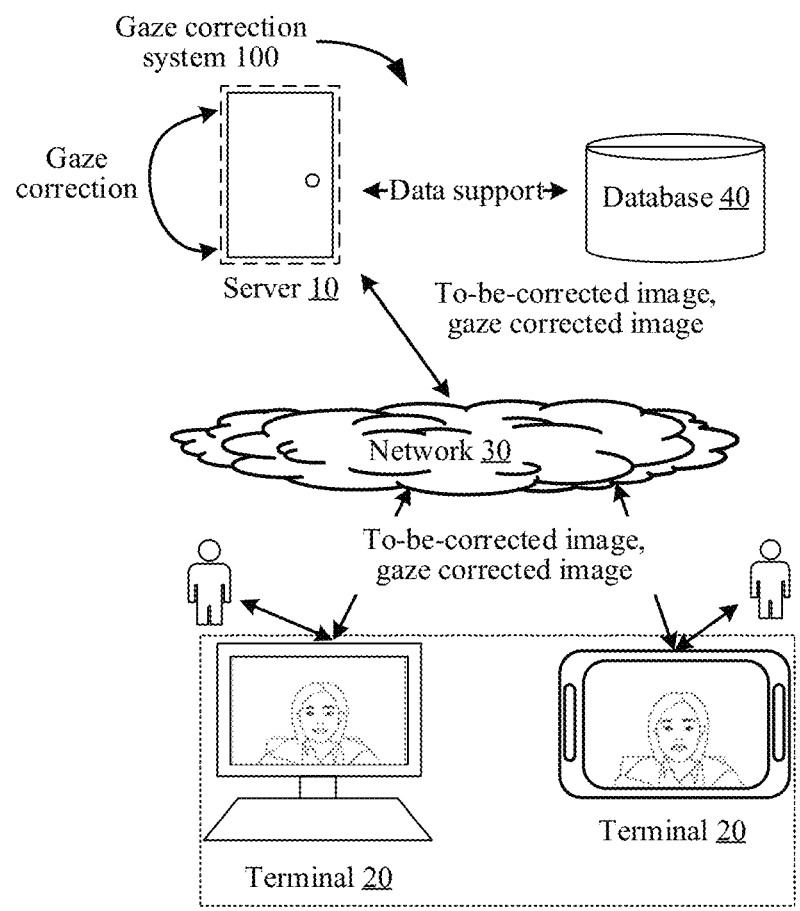
FIG. 1 is a schematic diagram of a solution implementation environment according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Before the embodiments the disclosure are described in detail, nouns and terms involved in the embodiments are described. The nouns and terms provided in the embodiments of are applicable to the following explanations.

1) Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and configured to determine the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system and electromechanical integration. AI software technologies mainly include fields such as a computer vision technology, a speech processing technology, a natural language processing technology, machine learning/deep learning, and the like.

2) The CV technology is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding (ISU), image retrieval, optical character recognition (OCR), video processing, video semantic understanding, video content/behavior recognition, three dimensional object reconstruction, a three-dimensional (3D) technology, virtual reality, augmented reality, synchronous positioning, and map construction, and further include biological feature recognition technologies such as common face recognition and fingerprint recognition.

3) ML is a multi-field interdiscipline, and relates to a plurality of disciplines such as the probability theory, statistics, the approximation theory, convex analysis and the algorithm complexity theory. ML specializes in studying how a computer simulates or implements a human learning behavior to acquire new knowledge or skills, and reorganize an existing knowledge structure, so as to keep improving its performance. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

An image gaze correction method and a method for training a gaze correction model provided by some embodiments relate to technologies such as machine learning of artificial intelligence and computer vision, which will be introduced and described below.

FIG. 1 is a schematic diagram of a solution implementation environment according to some embodiments. The solution implementation environment may be a video conference system. The solution implementation environment is used for implementing a gaze correction system 100, which may include a server 10 and a plurality of terminals 20.

The terminal 20 may be an electronic device such as a mobile phone, a tablet computer, a Personal Computer (PC), a smart TV, and a multimedia playback device. A client running a video conference application program may be installed in the terminal 20, so as to provide a user with a video conference function.

The server 10 may be an electronic device such as one server, a server cluster including a plurality of servers, or a cloud computing service center. The server 10 may be a backend server of the video conference application program, and is configured to provide a backend server for the client of the video conference application program.

The terminal 20 may communicate with the server 10 through a network 30. In addition, the gaze correction system 100 further includes a database 40 configured to provide data support to the server 20, for example, provide a training sample to the server 20 during model training.

The terminal 20 is configured to transmit a to-be-corrected image to the server 10 through the network 30 during the video conference, receive, through the network 30, a gaze corrected image transmitted by the server 10, and present the gaze corrected image.

The server 10 is configured to receive, through the network 30, the to-be-corrected image transmitted by the terminal 20, and acquire a to-be-corrected eye image from the to-be-corrected image; generate, based on the to-be-corrected eye image, an eye motion flow field and an eye contour mask, the eye motion flow field being used for adjusting a pixel position in the to-be-corrected eye image, and the eye contour mask being used for indicating a probability that the pixel position in the to-be-corrected eye image belongs to an eye region; perform, based on the eye motion flow field and the eye contour mask, gaze correction processing on the to-be-corrected eye image to obtain a corrected eye image; and generate a gaze corrected image based on the corrected eye image. The server is further configured to transmit the gaze corrected image to the terminal 20 through the network 30.

Figure 2:
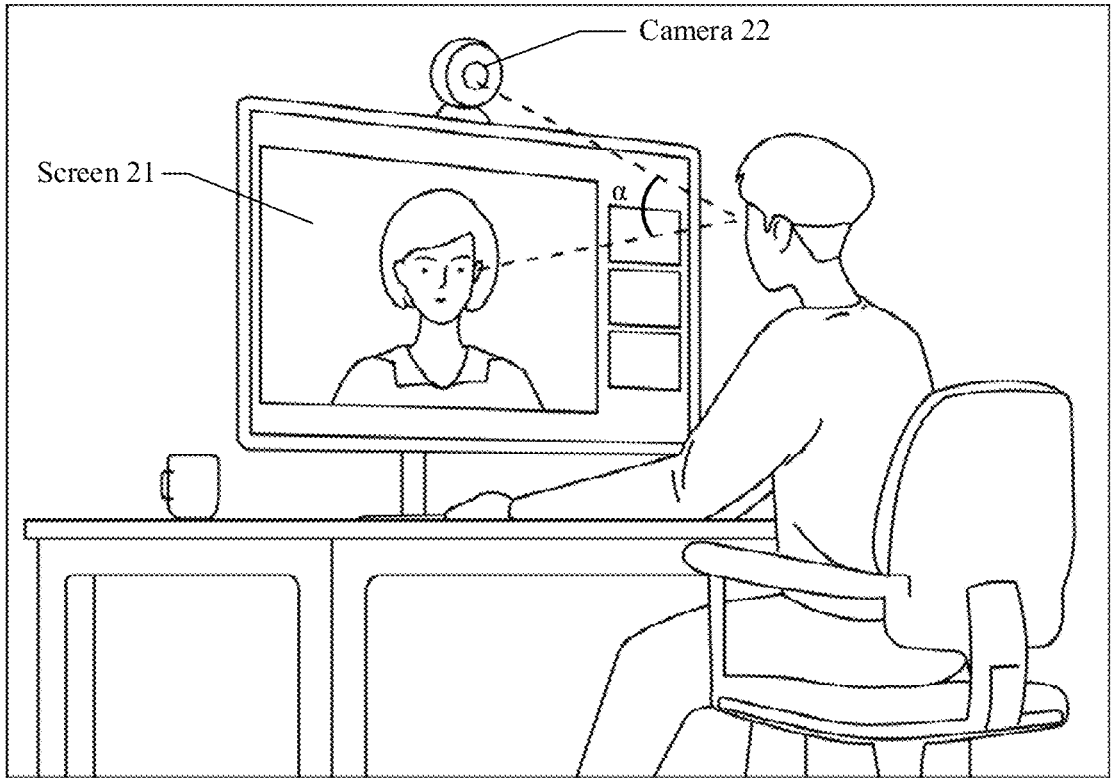
FIG. 2 is a schematic diagram of an included angle formed by a camera, human eyes, and an arrival position of a gaze of the human eyes in a video conference scenario.

As shown in FIG. 2, in a video conference scenario, the gaze of a user is generally looking at the other party in a screen 21, while a camera 22 is not in the screen 21 but in another position (above the screen 21 as shown in FIG. 2), and therefore, there is often an included angle (an included angle α shown by dotted lines in FIG. 2) between the camera 22, the human eyes, and the position at which the gaze of the human eyes is looking. From the perspective of the other party user, the gaze of the user is not looking at the other party user, but is downward, which affects the communication experience of the users. Moreover, in addition to the video conference scenario, a similar problem exists in a scenario such as a video call and a live video streaming. Therefore, gaze correction needs to be performed to solve the problem of poor image presentation effect, and to improve the presentation effect of the image and the efficiency of gaze correction.

Based on this, some embodiments propose an image gaze correction method and a method for training a gaze correction model, which can generate, in an end-to-end manner, a gaze corrected picture according to an inputted to-be-corrected picture, which reduces the time consumption and improves the correction accuracy, so that the gaze correction function truly reaches a practically available standard and is suitable for a scenario such as a video conference, a video call, a live video streaming, and image processing. The image processing scenario, such as a sharing scenario of social software, provides an editing function of changing the gaze, and supports correction of the gaze of an object in an image and a video of a user. For example, the object in the image originally looking at a is corrected to look at b, so that the image and the video convey information different from that in the original image and video.

Figure 3:
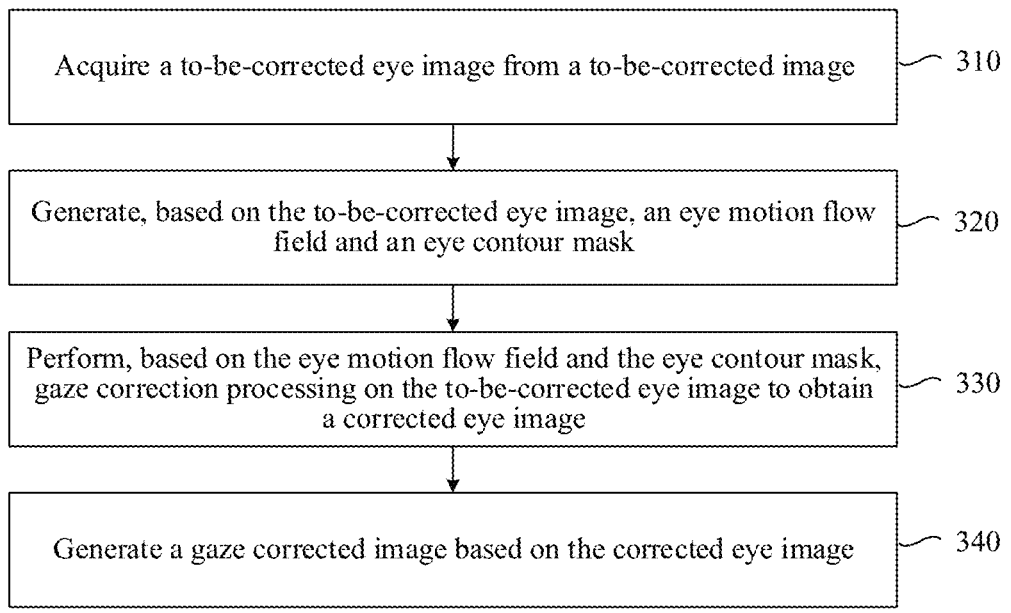
FIG. 3 is a first flowchart of an image gaze correction method according to some embodiments.

FIG. 3 is a flowchart of an image gaze correction method according to some embodiments. An execution body (referred to as the electronic device provided by some embodiments) of the image gaze correction method may be a terminal device such as a mobile phone, a tablet computer, and a PC, or a server. The image gaze correction method may include operations 310 to 340.

Operation 310: Acquire a to-be-corrected eye image from a to-be-corrected image.

In some embodiments, the to-be-corrected image refers to an image including a face, for example, an image including a human face. The to-be-corrected image may be a photo or a picture, or may be a video frame image in a video, which is not limited herein. The to-be-corrected eye image is captured from the to-be-corrected image, and includes an image of an eye region that requires gaze correction.

When the to-be-corrected image includes two eyes, for example, a human face image includes left and right human eyes, two to-be-corrected eye images may be obtained from one to-be-corrected image, one to-be-corrected eye image corresponds to the to-be-corrected eye image for the left eye, and the other to-be-corrected eye image corresponds to the to-be-corrected eye image for the right eye.

In some embodiments, an electronic device performs face detection on the to-be-corrected image. The to-be-corrected image being a human face image and the face detection being human face detection are illustrated as an example to determine whether the human face image contains a human face, and to determine a position of a human face if human face image contains the human face. In other words, in a case that the human face image contains a human face, human face key point detection is performed. Some embodiments are used for gaze correction and focus the eye region, and therefore, when performing the human face key point detection, the electronic device can only detect key points of eyes, and detection of key points of other parts such as the mouth and nose is not required.

In some embodiments, the electronic device determines a minimum circumscribed rectangle of the eye based on contour key points of the eye; specifies a multiple for extension of the minimum circumscribed rectangle to obtain an image capture frame of the eye; and captures, based on the image capture frame of the eye, the to-be-corrected eye image of the eye from the to-be-corrected image.

The minimum circumscribed rectangle of an eye refers to a minimum circumscribed rectangular frame containing the eye. For example, the minimum circumscribed rectangle of the left eye refers to a minimum circumscribed rectangular frame containing the left eye. The above specified multiple may be a preset value, such as 1.5 times, 2 times, or 3 times, which is not limited herein. In the process of obtaining an image capture frame by performing extension processing on the minimum circumscribed rectangle of the eye, the electronic device takes a center point of the minimum circumscribed rectangle as the center, and performs proportional enlarging processing on the minimum circumscribed rectangle to obtain an image capture frame. A center point of the image capture frame is the same as the center point of the minimum circumscribed rectangle above. Finally, an image capture technology is used for capturing an image content in the image capture frame of the eye from the to-be-corrected image, so as to obtain a to-be-corrected eye image of the eye.

It is understandable that acquiring the to-be-corrected eye image from the to-be-corrected image and performing the gaze correction processing on the to-be-corrected eye image can help reduce the amount of calculation in subsequent gaze correction operations and improve the efficiency of the gaze correction.

Operation 320: Generate, based on the to-be-corrected eye image, an eye motion flow field and an eye contour mask.

The eye motion flow field is used for adjusting a pixel position in the to-be-corrected eye image. A pixel value of each pixel in the eye motion flow field includes a horizontal displacement and a vertical displacement. The horizontal displacement of a pixel in the eye motion flow field represents a displacement of a pixel in the to-be-corrected eye image in the same position as the pixel in a horizontal direction, such as the number of pixels displaced in the horizontal direction. The vertical displacement of a pixel in the eye motion flow field represents a displacement of a pixel in the to-be-corrected eye image in the same position as the pixel in a vertical direction, such as the number of pixels displaced in the vertical direction. Alternatively, the eye motion flow field may include a two-dimensional image, for example, a first-dimensional image and a second-dimensional image, where the first-dimensional image is used for storing horizontal displacements of various pixels, and the second-dimensional image is used for storing vertical displacements of various pixels. Moreover, the sizes (including heights and widths) of the first-dimensional image and the second-dimensional image are the same as the size of the to-be-corrected eye image.

The eye contour mask is used for indicating a probability that the pixel position in the to-be-corrected eye image belongs to the eye region. For example, the eye contour mask may be represented as a one-dimensional image, and the size (including a height and a width) of the one-dimensional image is the same as the size of the to-be-corrected eye image. A pixel value of a pixel in the eye contour mask may be a probability value, indicating a probability that a pixel in the to-be-corrected eye image in the same position belongs to the eye region. For example, a pixel value of a position with coordinates (i, j) in the eye contour mask may be a probability value belonging to a value range of [0, 1], indicating a probability that a pixel of a position with coordinates (i, j) in the to-be-corrected eye image belongs to the eye region.

In some embodiments, the electronic device inputs the to-be-corrected eye image into a gaze correction model, and the eye motion flow field and the eye contour mask are outputted through the gaze correction model. The gaze correction model may be a machine learning model obtained by training a neural network in advance.

Figure 4:
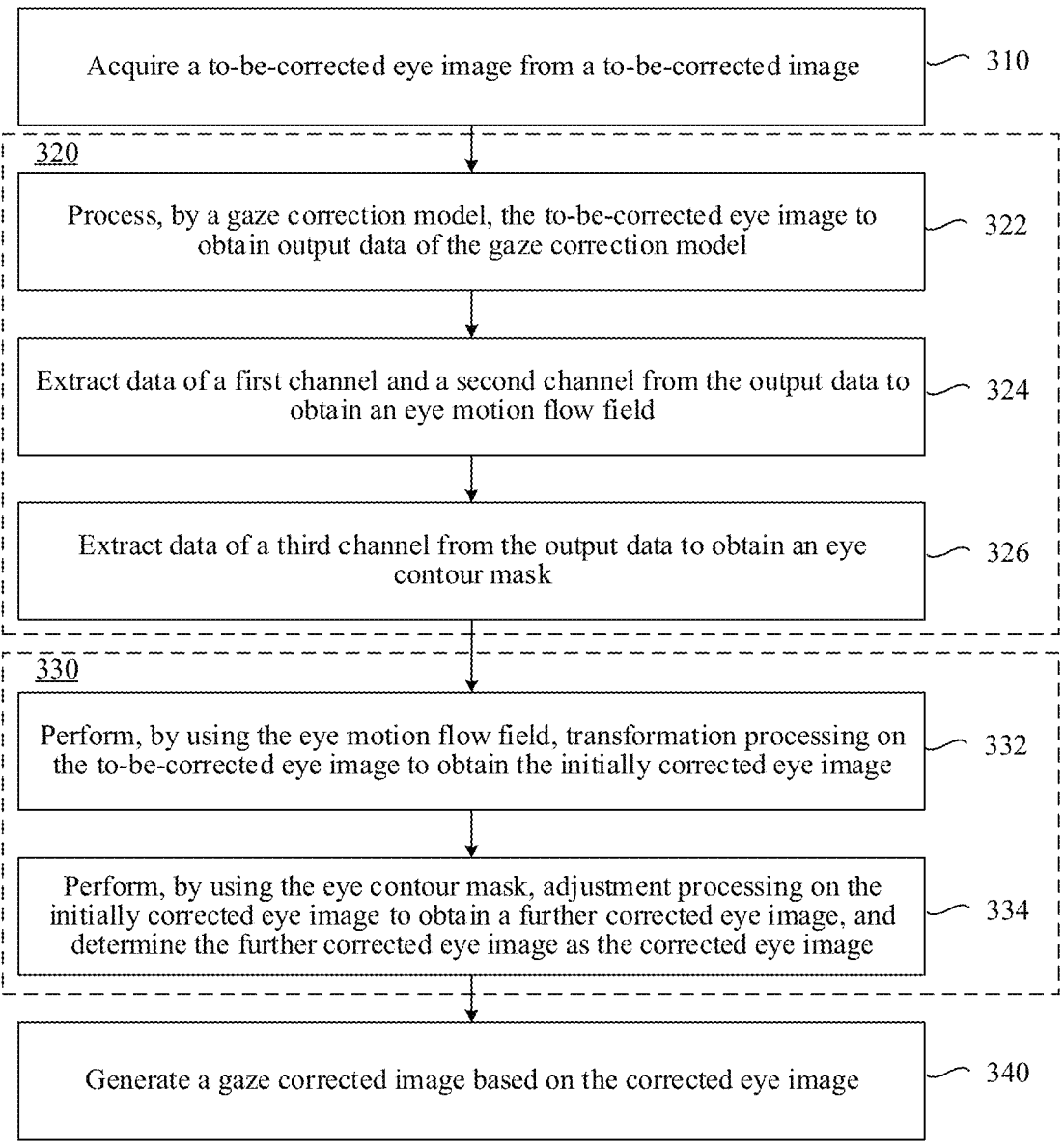
FIG. 4 is a second flowchart of an image gaze correction method according to some embodiments.

As shown in FIG. 4, operation 320 may include the following sub-operations.

Operation 322: Process, by the gaze correction model, the to-be-corrected eye image to obtain output data of the gaze correction model.

The to-be-corrected eye image may include an image of three channels: Red (R), Green (G), and Blue (B).

The gaze correction model may be a neural network model, for example, the gaze correction model may include an encoding network and a decoding network. The encoding network is configured to perform down-sampling processing on the input data (that is, the to-be-corrected eye image), and extract feature information of the to-be-corrected eye image. The decoding network is configured to perform up-sampling processing on the feature information of the to-be-corrected eye image to obtain output data.

For example, the down-sampling part of the gaze correction model (that is, the above encoding network) performs down-sampling processing on the to-be-corrected eye image to generate a down-sampled image. The up-sampling part of the gaze correction model (that is, the above decoding network) performs up-sampling processing on the down-sampled image to obtain the output data of the gaze correction model. A backbone architecture of the gaze correction model proposed in some embodiments mainly includes two parts: the down-sampling part and the up-sampling part. In the down-sampling part, a multi-operation convolution operation (or referred to as a down-sampling operation) is performed on the inputted image, the size of a feature map is continuously reduced and the number of channels is continuously increased, which is used for focusing the image information and acquiring image texture information in an eye contour region In the up-sampling part, a convolution and interpolation operation (or referred to as an up-sampling operation) is performed on the feature map, the size of the feature map is continuously increased and the number of channels is continuously reduced (the number of channels of the feature map in the last layer of the up-sampling part is reduced to 3), which is used for generating, from the obtained image texture information, a feature map with a resolution and size the same as those of the inputted image, for subsequent generation of the corrected image.

It is understandable that, in order to improve the stability of the gaze correction model for performing gaze correction, during the up-sampling processing, the feature map generated by the current up-sampling operation and the feature map of the same size generated in the down-sampling processing are cascaded and then used as an input image for the next up-sampling operation. In this way, the problem of gradient explosion in the gaze correction process can be solved, and the stability of the model can be improved. In addition, the problem of gradient explosion in a training process of the gaze correction model can be solved, and the stability of the training process of the gaze correction model can be improved.

In some embodiments, operation 320 of generating, based on the to-be-corrected eye image, an eye motion flow field and an eye contour mask includes: performing, by the electronic device, down-sampling processing on the to-be-corrected eye image to generate a down-sampled image; and performing up-sampling processing on the down-sampled image to obtain the eye motion flow field and the eye contour mask, where during the up-sampling processing, a feature map generated by the current up-sampling operation and a feature map of the same size generated during the down-sampling processing are cascaded and then used as an input image of a next up-sampling operation.

The down-sampling processing and the up-sampling processing are implemented by the gaze correction model. The eye motion flow field is data of a first channel and a second channel in output data of the gaze correction model, and the eye contour mask is data of a third channel in the output data.

Operation 324: Extract the data of the first channel and the second channel from the output data to obtain the eye motion flow field.

Operation 326: Extract the data of the third channel from the output data to obtain the eye contour mask.

The output data may include a 3-channel image (or data), and the data of the first channel and the data of the second channel are extracted from the output data to obtain the eye motion flow field. The data of the third channel is extracted from the output data to obtain the eye contour mask. For example, the data of the first channel is used as a first-dimensional image used for storing horizontal displacements of various pixels. The data of the second channel is used as a second-dimensional image used for storing vertical displacements of various pixels.

For example, the to-be-corrected eye image has a height of H and a width of W. H and W may represent the number of pixels in a height direction and the number of pixels in a width direction, respectively. Then, the to-be-corrected eye image is a three-channel image of H×W×3, which is used as the input data of the gaze correction model. The output data of the gaze correction model includes a three-channel image of H×W×3, from which the data H×W×2 of two channels is extracted and regarded as the eye motion flow field, and the data H×W×1 of the remaining one channel is extracted and regarded as the eye contour mask.

Operation 330: Perform gaze correction processing on the to-be-corrected eye image based on the eye motion flow field and the eye contour mask to obtain a corrected eye image.

In some embodiments, after the gaze correction model outputs the eye motion flow field and the eye contour mask, the electronic device uses the eye motion flow field to perform bi-linear affine transformation on the to-be-corrected eye image, and each pixel performs moving and Warping, so that an initially corrected eye image may be obtained. In order to improve the stability of the initially corrected eye image and reduce slight transformation of a region outside the eye contour, the gaze correction model is further configured to acquire the eye contour mask. The electronic device classifies the eye contour mask (for example, performs a sigmoid operation) to normalize a probability relative size of each pixel in the eye contour mask to a probability value between 0 and 1, and then fuses, based on the eye contour after the classification processing, the to-be-corrected eye image and the initially corrected eye image through an attention mechanism to obtain the corrected eye image, which not only improves the stability of the corrected eye image, but also ensures that only the image of the eye contour region is corrected, thereby improving the accuracy of the gaze correction.

As shown in FIG. 4, operation 330 may include the following operations.

Operation 332: Perform, by using the eye motion flow field, transformation processing on the to-be-corrected eye image to obtain an initially corrected eye image.

In some embodiments, for any pixel in the to-be-corrected eye image, the electronic device acquires a horizontal displacement and a vertical displacement of the pixel from the eye motion flow field, and then performs displacement processing on the pixel based on the horizontal displacement and vertical displacement to obtain the initially corrected eye image.

For example, for any pixel in the to-be-corrected eye image, the horizontal displacement and the vertical displacement of the pixel are acquired from the eye motion flow field, and then displacement processing is performed on the pixel based on the horizontal displacement and the vertical displacement to obtain the initially corrected eye image.

For example, the to-be-corrected eye image is x, the initially corrected eye image is y, the eye motion flow field is f, and for any position with coordinates (i, j) in the image, y (i, j) is calculated as follows: y (i, j)=x (i+f (i, j) [0], j+f (i, j) [1]). Since i+f (i, j) [0] and j+f (i, j) [1] are floating point numbers, the electronic device uses bi-linear interpolation for calculation.

Operation 334: Perform, by using the eye contour mask, adjustment processing on the initially corrected eye image to obtain a further corrected eye image, and determine the further corrected eye image as the corrected eye image.

In some embodiments, operation 334 may include the following operations.

Operation 3341: Fuse (for example, multiply) pixel values of corresponding positions in the eye contour mask and the initially corrected eye image to obtain a first intermediate image.

Operation 3342: Fuse (for example, multiply) pixel values of corresponding positions in a mapped image corresponding to the eye contour mask and the to-be-corrected eye image to obtain a second intermediate image.

Operation 3343: Integrate (for example, add) pixel values of corresponding positions in the first intermediate image and the second intermediate image to obtain the corrected eye image.

In some embodiments, a pixel value of each position in the eye contour mask is a probability value belonging to a value range of [0, 1], and a pixel value of any position in the mapped image corresponding to the eye contour mask is a value obtained by subtracting the pixel value (that is, the probability value) at the same position in the eye contour mask from 1. For example, a pixel value (that is, a probability value) at a position with coordinates (i, j) in the eye contour mask is 0.2, and therefore, a pixel value at a position with coordinates (i, j) in the mapped image corresponding to the eye contour mask is 1−0.2=0.8.

In some embodiments, the corrected eye image generated by the electronic device may be represented by the following expression: Corrected eye image=eye contour mask×initially corrected eye image+(1−eye contour mask)×to-be-corrected eye image.

Operation 340: Generate a gaze corrected image based on the corrected eye image.

In some embodiments, the electronic device integrates the corrected eye image into the original to-be-corrected image, and uses the corrected eye image to cover or replace the to-be-corrected eye image in the to-be-corrected image to obtain the gaze corrected image.

In some embodiments, the electronic device integrates the corrected eye image into the to-be-corrected eye image at an image capture frame position of the to-be-corrected image to obtain an integrated image; and performs image harmonization processing at the image capture frame position in the integrated image to obtain the gaze corrected image. The image harmonization processing is used for eliminating boundary traces at the image capture frame position.

In some embodiments, the method used by the electronic device for performing the image harmonization processing is not limited. For example, Gaussian blurring, erosion and dilation, an image harmonization method based on deep learning, or the like may be used.

In some embodiments, the electronic device adopts the following operations to perform the image harmonization processing at the image capture frame position in the integrated image to obtain the gaze corrected image.

First, the electronic device generates an initialized mask image of the same size as the to-be-corrected image. A pixel value of the initialized mask image at the image capture frame position is 1 (referred to as a first specified value), and pixel values of other positions is 0 (referred to as a second specified value). For example, the size of the original to-be-corrected image is C×H×W; where C is the number of channels (for example, including three channels of R, G, and B), H is the height (for example, the number of pixels contained in the height direction), and W is the width (for example, the number of pixels contained in the width direction). The image capture frame is a rectangular frame of a size h×w at a target position in the to-be-corrected image, where h is the height (for example, the number of pixels contained in the height direction), and w is the width (for example, the number of pixels contained in the width direction). The size of the to-be-corrected eye image and the size of the corrected eye image are both c×h×w, where c is the number of channels (for example, including three channels of R, G, and B).

The electronic device generates the initialized mask image of the size C×H×W. For each single-channel image H×W in the C channels, a pixel value in the h×w image capture frame at the above target position is set to 1, and pixel values of other regions except the image capture frame are set to 0, for serving as the initialized mask image.

Next, the electronic device performs noise processing (for example, erosion processing and Gaussian blurring) on the initialized mask image to obtain a processed mask image.

The erosion processing is used for eliminating boundary points between objects. For example, an ellipse template may be used to perform the erosion processing on the initialized mask image to obtain a mask image after erosion. The Gaussian blurring, also referred to as Gaussian smoothing, is used for reducing image noise and level of details. After obtaining the above mask image after erosion, the electronic device may perform Gaussian blurring on the mask image after erosion to obtain the processed mask image. The processed mask image is still an image of the size C×H×W, a value of each pixel is in a range of [0, 1], and for a pixel originally located at a boundary position between 0 and 1, a value thereof will be between 0 and 1 after the above erosion operation and Gaussian blurring, thereby achieving a smooth transition.

Further, the electronic device fuses (for example, multiplies) pixel values of corresponding positions in the processed mask image and the integrated image to obtain a first generated image.

Then, the electronic device fuses (for example, multiplies) pixel values of corresponding positions in a mapped image corresponding to the processed mask image and the human face image to obtain a second generated image.

Finally, the electronic device adds pixel values of corresponding positions in the first generated image and the second generated image to obtain the gaze corrected image.

The pixel value of each position in the processed mask image is a value belonging to the value range of [0, 1]. The pixel value of any position in the mapped image corresponding to the processed mask image is a value obtained by subtracting the pixel value in the same position in the processed mask image from 1. For example, a pixel value at a position with coordinates (i, j) in the processed mask image is 0.3, and therefore, a pixel value at a position with coordinates (i, j) in the mapped image corresponding to the processed mask image is 1−0.3=0.7.

In some embodiments, the gaze corrected image generated by the electronic device may be represented by the following expression: Gaze corrected image=processed mask image×integrated image+(1−processed mask image)× to-be-corrected image.

It is understandable that, through the image harmonization processing, the boundary traces located at the image capture frame position in the integrated image can be eliminated, so that the finally obtained gaze corrected image has no obvious splicing traces. Accordingly, the gaze correction effect can be enhanced.

Figure 5:
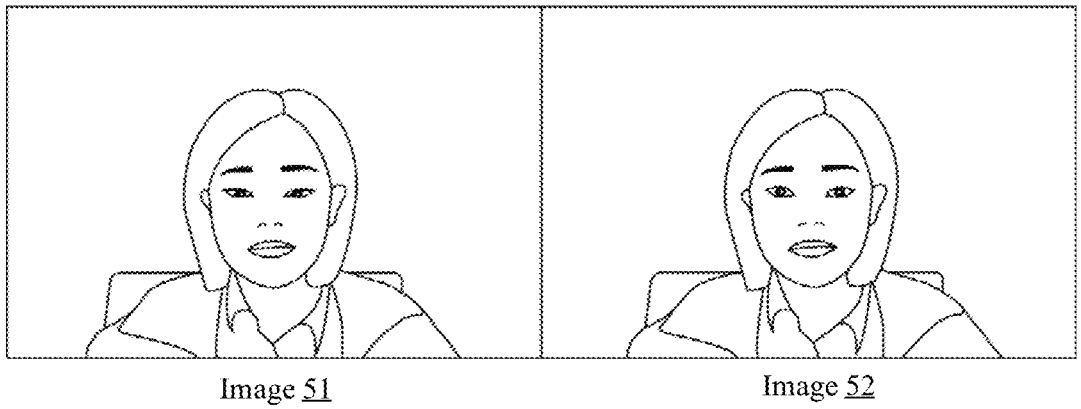
FIG. 5 is a contrast diagram before and after gaze correction according to some embodiments.

FIG. 5 is a contrast diagram before and after gaze correction by using an image gaze correction method according to some embodiments. As shown in FIG. 5, an image 51 is a to-be-corrected image, and the gaze of a human eye is offset. An image 52 is a gaze corrected image, and the gaze of the eye is focused straight ahead.

Figure 6:
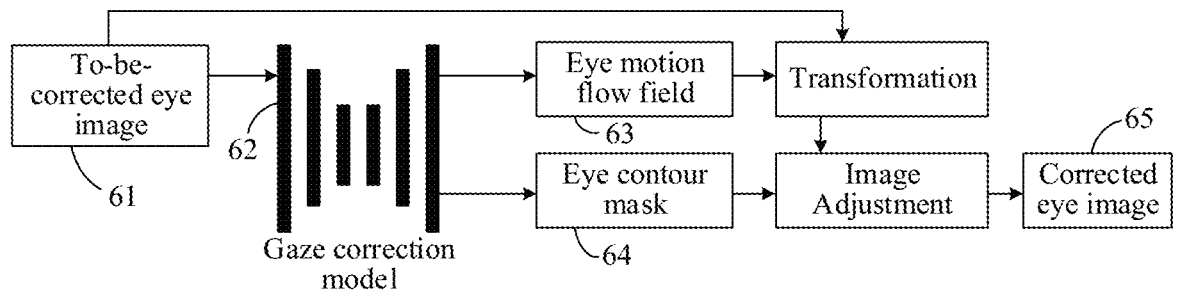
FIG. 6 is a schematic diagram of a gaze correction model according to some embodiments.

As shown in FIG. 6, a to-be-corrected eye image 61 is inputted to a gaze correction model 62, an eye motion flow field 63 and an eye contour mask 64 are outputted by the gaze correction model 62. The eye motion flow field 63 is used for performing transformation processing on the to-be-corrected eye image 61 to generate an initially corrected eye image. Then, the eye contour mask 64 is used for performing image adjustment processing on the initially corrected eye image to generate a final corrected eye image 65.

It is understandable that the image gaze correction method provided by some embodiments directly generates the corrected eye image in an end-to-end manner according to the to-be-corrected eye image, which can reduce time consumption and improve the accuracy of the gaze correction, thereby improving the consumption and effect of the gaze correction, being suitable for a scenario such as a video conference, a video call, and a live video streaming. In addition, using the image gaze correction method according to some embodiments may correct the gaze in the to-be-corrected image in real time, so that the corrected image includes an emmetropic effect, which improves the accuracy and realism, and can effectively improve the communication experience of the user in a scenario such as a video conference.

In addition, some embodiments combine the eye contour mask in the process of gaze correction, and use the attention mechanism to fuse the to-be-corrected eye image and the initially corrected eye image that is obtained through the eye motion flow field, which not only improves the stability of the generated image but also ensures that only the image content inside the eye contour is subject to gaze correction, while the image content outside the eye contour does not require gaze correction, thereby improving the gaze correction effect of the finally obtained corrected eye image.

A process of training the gaze correction model is introduced and explained below, and the content involved during the use of the gaze correction model is similar to the content involved in the training process.

Figure 7:
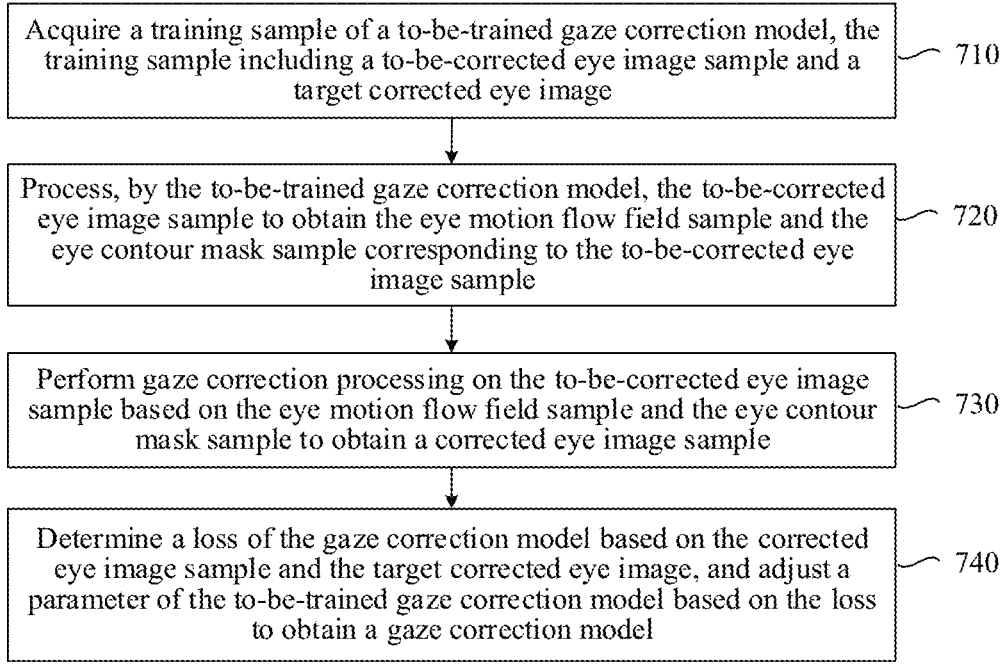
FIG. 7 is a flowchart of a method for training a gaze correction model according to some embodiments.

FIG. 7 is a flowchart of a method for training a gaze correction model according to some embodiments. An execution body of the method for training a gaze correction model may be an electronic device such as a computer and a server. The method for training a gaze correction model may include operations 710-740.

Operation 710: Acquire a training sample of a to-be-trained gaze correction model, the training sample including a to-be-corrected eye image sample and a target corrected eye image.

The to-be-trained gaze correction model may be a neural network model, which is a to-be-trained model for gaze correction, and may be an original model or a pre-trained model, which is not limited herein.

In some embodiments, input data of the to-be-trained gaze correction model includes the to-be-corrected eye image sample, and output data includes an eye motion flow field sample and an eye contour mask sample.

Each training sample includes two images, which are two images of the same object (for example, a person) with different gazes captured at the same head pose angle. One image may be an image in any gaze direction (for example, the gaze is facing a screen region), and the image is used as the to-be-corrected eye image sample. The other image is an image with the gaze right facing the camera, and the image is used as the target corrected eye image. The to-be-trained gaze correction model is trained by using such training samples, and an end-to-end gaze correction model may be obtained by the training. The gaze correction model outputs a corrected eye image with an emmetropic effect (for example, the gaze is facing the camera) based on the inputted to-be-corrected eye image.

Different training samples may be obtained based on different objects (for example, different characters), or may be obtained based on different head pose angles, which is not limited herein. In other words, a training sample set of the to-be-trained gaze correction model may include a plurality of training samples, and the plurality of training samples may include training samples with different objects and include training samples with different head pose angles, so that the gaze correction model obtained by training can adapt to different objects and different head pose angles, thereby improving the robustness of the gaze correction model.

Operation 720: Process, by the to-be-trained gaze correction model, the to-be-corrected eye image sample to obtain the eye motion flow field sample and the eye contour mask sample corresponding to the to-be-corrected eye image sample.

The eye motion flow field sample is used for adjusting a pixel position in the to-be-corrected eye image sample. The eye contour mask sample is used for indicating a probability that the pixel position in the to-be-corrected eye image sample belongs to an eye region. The eye motion flow field sample is similar to the eye motion flow field in description, and the eye contour mask sample is also similar to the eye contour mask in description.

Operation 730: Perform gaze correction processing on the to-be-corrected eye image sample based on the eye motion flow field sample and the eye contour mask sample to obtain a corrected eye image sample.

In some embodiments, the electronic device uses the eye motion flow field sample to perform transformation processing on the to-be-corrected eye image sample to generate the initially corrected eye image sample; and uses the eye contour mask sample to perform adjustment processing on the initially corrected eye image sample to generate the corrected eye image sample. The detailed description of the process is similar to the process of acquiring the corrected eye image.

Operation 740: Determine a loss of the gaze correction model based on the corrected eye image sample and the target corrected eye image, and adjust a parameter of the to-be-trained gaze correction model based on the loss to obtain a gaze correction model.

In some embodiments, the electronic device directly calculates the loss of the to-be-trained gaze correction model based on a pixel difference between the corrected eye image sample and the target corrected eye image, and adjusts, based on the loss, the parameter of the to-be-trained gaze correction model, thereby obtaining the gaze correction model. The loss may be an L1 loss, an L2 loss, and the like.

In some embodiments, the loss of the to-be-trained gaze correction model includes a Learned Perceptual Image Patch Similarity (LPIPS) loss, and a visual perception difference between the two images may be accurately obtained through the LPIPS loss.

The LPIPS loss may be obtained by calculation through a loss calculation model generated by pre-training in advance. The electronic device inputs the corrected eye image sample and the target corrected eye image to the loss calculation model. The LPIPS loss between the corrected eye image sample and the target corrected eye image is outputted by the loss calculation model. The loss calculation model may be a pre-trained convolutional neural network model, such as a Visual Geometry Group (VGG) model.

In some embodiments, the electronic device may generate a plurality of simulated image pairs by using a software simulation technology, and each simulated image pair includes a set of corresponding non-emmetropic eye simulated image and emmetropic eye simulated image. The electronic device uses the plurality of simulated image pairs above for training to obtain the loss calculation model.

Although the appearance and texture information of the simulated image is different from that of a real eye, a relationship between a gaze direction and an eyeball position of the simulated image is no different from a relationship between a gaze direction and an eyeball position of the real object, and the gaze direction of the simulated image has been determined when the data is generated. In this way, a lot of annotation costs can be reduced and the standard efficiency can be improved.

It is understandable that the loss calculation model pre-trained by the simulated images in some embodiments may be directly used for the calculation of the LPIPS loss in the model training corresponding to real eye data. The visual perception information represented by the LPIPS loss obtained by the loss calculation model is the gaze direction, and therefore, the training effect and efficiency of the model can be improved.

It is further understandable that, with the image gaze correction method and the method for training a gaze correction model provided in some embodiments, by training the gaze correction model, the corrected eye image can be generated in an end-to-end manner according to the inputted to-be-corrected eye image, which greatly reduces the time consumption and improves the correction accuracy, so that the gaze correction function truly reaches the practically available standard, and is suitable for a scenario such as a video conference, a video call, and a live video streaming. In addition, by using the image gaze correction method and the method for training a gaze correction model provided in some embodiments, the gaze of the eye in the to-be-corrected image may be corrected in real time, so that the gaze corrected image is an emmetropic image (for example, it seems to right face the camera), which has both accuracy and realism, and may effectively improve the communication experience of the user in a scenario such as the video conference.

Figure 8:
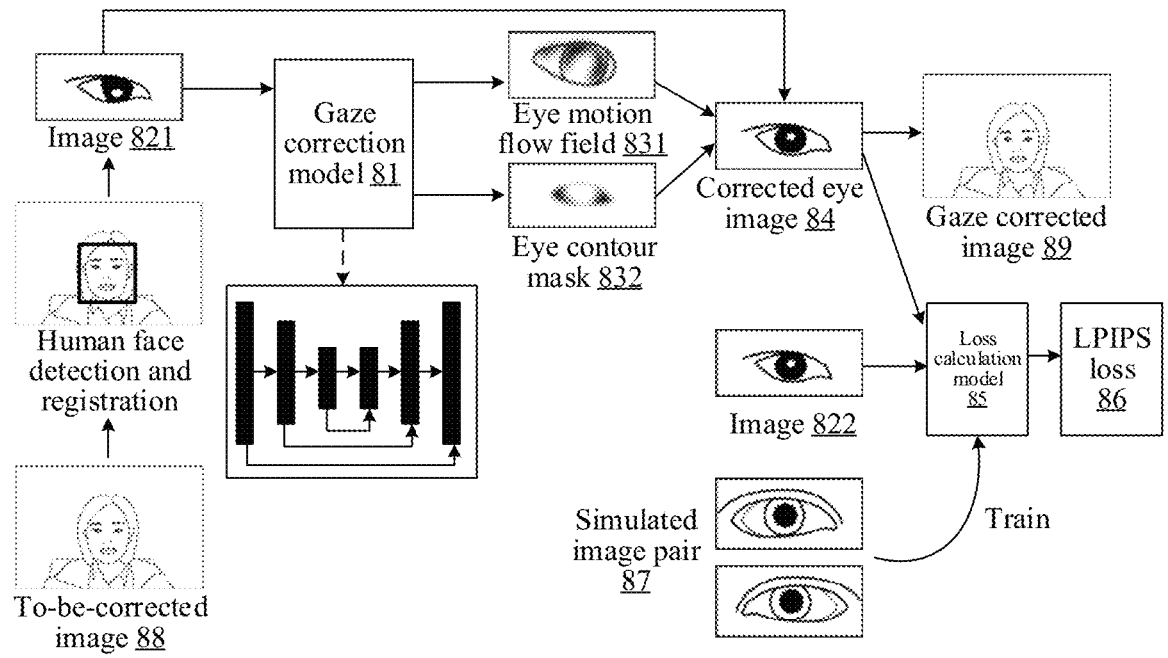
FIG. 8 is an architectural diagram of an overall solution according to some embodiments.

FIG. 8 is an architectural diagram of an overall solution according to some embodiments. As shown in FIG. 8, if it is a model training process, a training sample of a gaze correction model 81 (referred to as a to-be-trained gaze correction model) includes an image 821 (referred to as a to-be-corrected eye image sample) and an image 822 (referred to as a target corrected eye image). The image 821 is inputted to the gaze correction model 81, an eye motion flow field 831 and an eye contour mask 832 (referred to as an eye motion flow field sample and an eye contour mask sample) corresponding to the image 821 are outputted, and then the image 821 and its corresponding eye motion flow field 831 and eye contour mask 832 are combined to generate a corrected eye image 84 (referred to as a corrected eye image sample). A pre-trained loss calculation model 85 is configured to determine an LPIPS loss 86 of the gaze correction model 81 based on the corrected eye image 84 and the image 822, and adjust a parameter of the gaze correction model 81 based on the LPIPS loss 86. The loss calculation model 85 is obtained by training through simulated image pairs 87.

If it is an online model using process, a video frame image is extracted from a video stream of a real-time video scenario, such as a video conference, and regarded as a to-be-corrected image 88, and human face detection and registration is performed on the to-be-corrected image 88 to capture an image 821 (referred to as a to-be-corrected eye image) from the to-be-corrected image 88. The image 821 is inputted to a trained gaze correction model 81, and the gaze correction model 81 outputs an eye motion flow field 831 and an eye contour mask 832 (referred to as an eye motion flow field and an eye contour mask) corresponding to the image 821. Then, the image 821 and its corresponding eye motion flow field 831 and eye contour mask 832 are combined to generate a corrected eye image 84. Finally, the corrected eye image 84 is integrated with the original to-be-corrected image 88 to generate a gaze corrected image 89.

Figure 9:
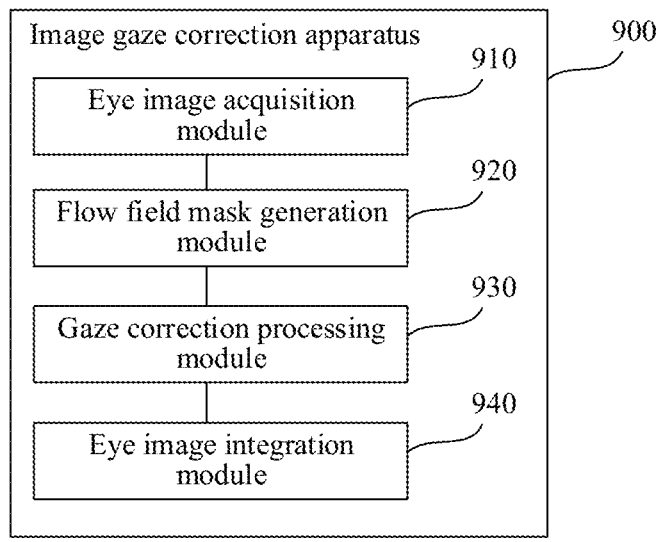
FIG. 9 is a block diagram of an image gaze correction apparatus according to some embodiments.

FIG. 9 is a block diagram of an image gaze correction apparatus according to some embodiments. The image gaze correction apparatus includes a function for implementing the image gaze correction method according to some embodiments, and the function may be implemented by hardware or by hardware executing corresponding software. The apparatus may be an electronic device such as a computer device, or may be disposed in an electronic device such as a computer device. The image gaze correction apparatus 900 may include: an eye image acquisition module 910, a flow field mask generation module 920, a gaze correction processing module 930, and an eye image integration module 940.

The eye image obtaining module 910 is configured to acquire a to-be-corrected eye image from a to-be-corrected image.

The flow field mask generation module 920 is configured to generate, based on the to-be-corrected eye image, an eye motion flow field and an eye contour mask, the eye motion flow field being used for adjusting a pixel position in the to-be-corrected eye image, and the eye contour mask being used for indicating a probability that the pixel position in the to-be-corrected eye image belongs to an eye region.

The gaze correction processing module 930 is configured to perform, based on the eye motion flow field and the eye contour mask, gaze correction processing on the to-be-corrected eye image to obtain a corrected eye image.

The eye image integration module 940 is configured to generate a gaze corrected image based on the corrected eye image.

In some embodiments, the gaze correction processing module 930 is further configured to perform, by using the eye motion flow field, transformation processing on the to-be-corrected eye image to obtain an initially corrected eye image; and perform, by using the eye contour mask, adjustment processing on the initially corrected eye image to obtain a further corrected eye image, and determine the further corrected eye image as the corrected eye image, where the gaze correction processing includes the transformation processing and the adjustment processing.

In some embodiments, the gaze correction processing module 930 is further configured to fuse pixel values of corresponding positions in the eye contour mask and the initially corrected eye image to obtain a first intermediate image; fusing pixel values of corresponding positions in a mapped image corresponding to the eye contour mask and the to-be-corrected eye image to obtain a second intermediate image; and integrate pixel values of corresponding positions in the first intermediate image and the second intermediate image to obtain the further corrected eye image.

In some embodiments, the flow field mask generation module 920 is further configured to perform down-sampling processing on the to-be-corrected eye image to generate a down-sampled image; and perform up-sampling processing on the down-sampled image to obtain the eye motion flow field and the eye contour mask, where during the up-sampling processing, a feature map generated by the current up-sampling operation and a feature map of the same size generated during the down-sampling processing are cascaded and then used as an input image of a next up-sampling operation.

In some embodiments, the down-sampling processing and the up-sampling processing are implemented by a gaze correction model, and the eye motion flow field is data of a first channel and a second channel in output data of the gaze correction model, and the eye contour mask is data of a third channel in the output data.

In some embodiments, the eye image acquisition module 910 is further configured to recognize contour key points of eyes from the to-be-corrected image; determine a minimum circumscribed rectangle based on the contour key points; specify a multiple for extension of the minimum circumscribed rectangle to obtain an image capture frame; and capture, based on the image capture frame, the to-be-corrected eye image from the to-be-corrected image.

In some embodiments, the eye image integration module 940 is further configured to integrate the corrected eye image into an image capture frame position of the to-be-corrected image to obtain an integrated image, where the image capture frame position is a position of the to-be-corrected eye image in the to-be-corrected image; and perform image harmonization processing at the image capture frame position in the integrated image to obtain the gaze corrected image, where the image harmonization process is used for eliminating boundary traces at the image capture frame position.

In some embodiments, the eye image integration module 940 is further configured to generate an initialized mask image of the same size as the to-be-corrected image, where a pixel value of the initialized mask image at the image capture frame position is a first specified value, pixel values of remaining positions are a second specified value different from the first specified value, and the remaining positions are positions in the initialized mask image except the image capture frame position; perform noise processing on the initialized mask image to obtain a processed mask image; fuse pixel values of corresponding positions in the processed mask image and the integrated image to obtain a first generated image; fuse pixel values of corresponding positions in a mapped image corresponding to the processed mask image and the to-be-corrected image to obtain a second generated image; and integrate pixel values of corresponding positions in the first generated image and the second generated image to obtain the gaze corrected image.

Figure 10:
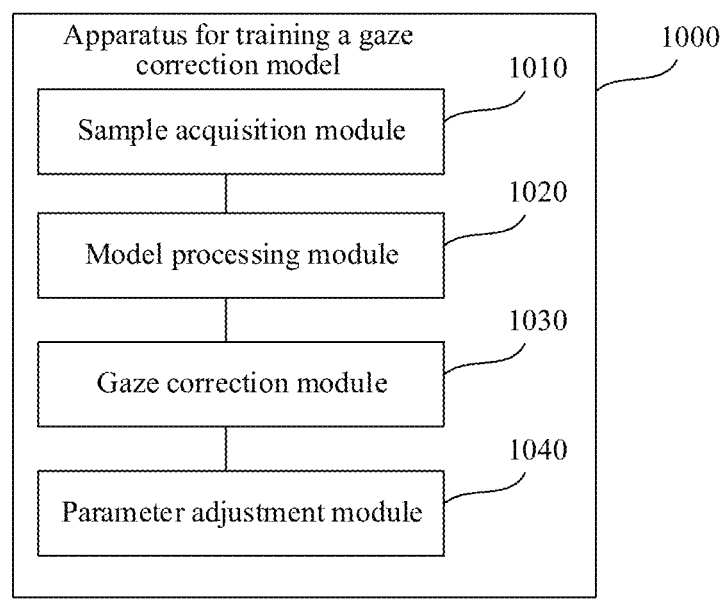
FIG. 10 is a block diagram of an apparatus for training a gaze correction model according to some embodiments.

FIG. 10 is a block diagram of an apparatus for training a gaze correction model according to some embodiments. The apparatus for training a gaze correction model includes a function for implementing the method for training a gaze correction model according to some embodiments, and the function may be implemented by hardware or by hardware executing corresponding software. The apparatus for training a gaze correction model may be an electronic device such as a computer device, or may be disposed in an electronic device such as a computer device. The apparatus 1000 for training a gaze correction model may include: a sample acquisition module 1010, a model processing module 1020, a gaze correction module 1030, and a parameter adjustment module 1040.

The sample acquisition module 1010 is configured to acquire a training sample of a to-be-trained gaze correction model, the training sample including a to-be-corrected eye image sample and a target corrected eye image.

The model processing module 1020 is configured to process, by the to-be-trained gaze correction model, the to-be-corrected eye image sample to obtain an eye motion flow field sample and an eye contour mask sample corresponding to the to-be-corrected eye image sample, the eye motion flow field sample being used for adjusting a pixel position in the to-be-corrected eye image sample, and the eye contour mask sample being used for indicating a probability that the pixel position in the to-be-corrected eye image sample belongs to an eye region.

The gaze correction module 1030 is configured to perform, based on the eye motion flow field sample and the eye contour mask sample, gaze correction processing on the to-be-corrected eye image sample to obtain a corrected eye image sample.

The parameter adjustment module 1040 is configured to determine, based on the corrected eye image sample and the target corrected eye image, a loss of the to-be-trained gaze correction model, and adjust a parameter of the to-be-trained gaze correction model based on the loss to obtain a gaze correction model.

In some embodiments, the loss includes a learned perceptual image patch similarity (LPIPS) loss. The parameter adjustment module 1040 is further configured to output the LPIPS loss between the corrected eye image sample and the target corrected eye image through a loss calculation model; and determine the LPIPS loss as the loss of the to-be-trained gaze correction model.

In some embodiments, the parameter adjustment module 1040 is further configured to generate a plurality of simulated image pairs, where each of the simulated image pairs includes a set of corresponding non-emmetropic eye simulated image and emmetropic eye simulated image; and train the loss calculation model by using the plurality of simulated image pairs.

In some embodiments, the apparatus 1000 for training a gaze correction model further includes: a loss model training module (not shown in FIG. 10) configured to generate a plurality of simulated image pairs by using a software simulation technology, where each of the simulated image pairs includes a set of corresponding non-emmetropic eye simulated image and emmetropic eye simulated image; and train the loss calculation model by using the plurality of simulated image pairs.

When the image gaze correction apparatus and the apparatus for training a gaze correction model provided in some embodiments implement the corresponding functions, only division of the foregoing functional modules is used as an example for description. In the practical application, the functions may be allocated to and completed by different functional modules according to requirements. That is, an internal structure of the electronic device is divided into different functional modules, to complete all or some of the functions described above. In addition, the image gaze correction apparatus and the apparatus for training a gaze correction model according to some embodiments belong to the same inventive concept as the image gaze correction method and the method for training a gaze correction model according to some embodiments.

Figure 11:
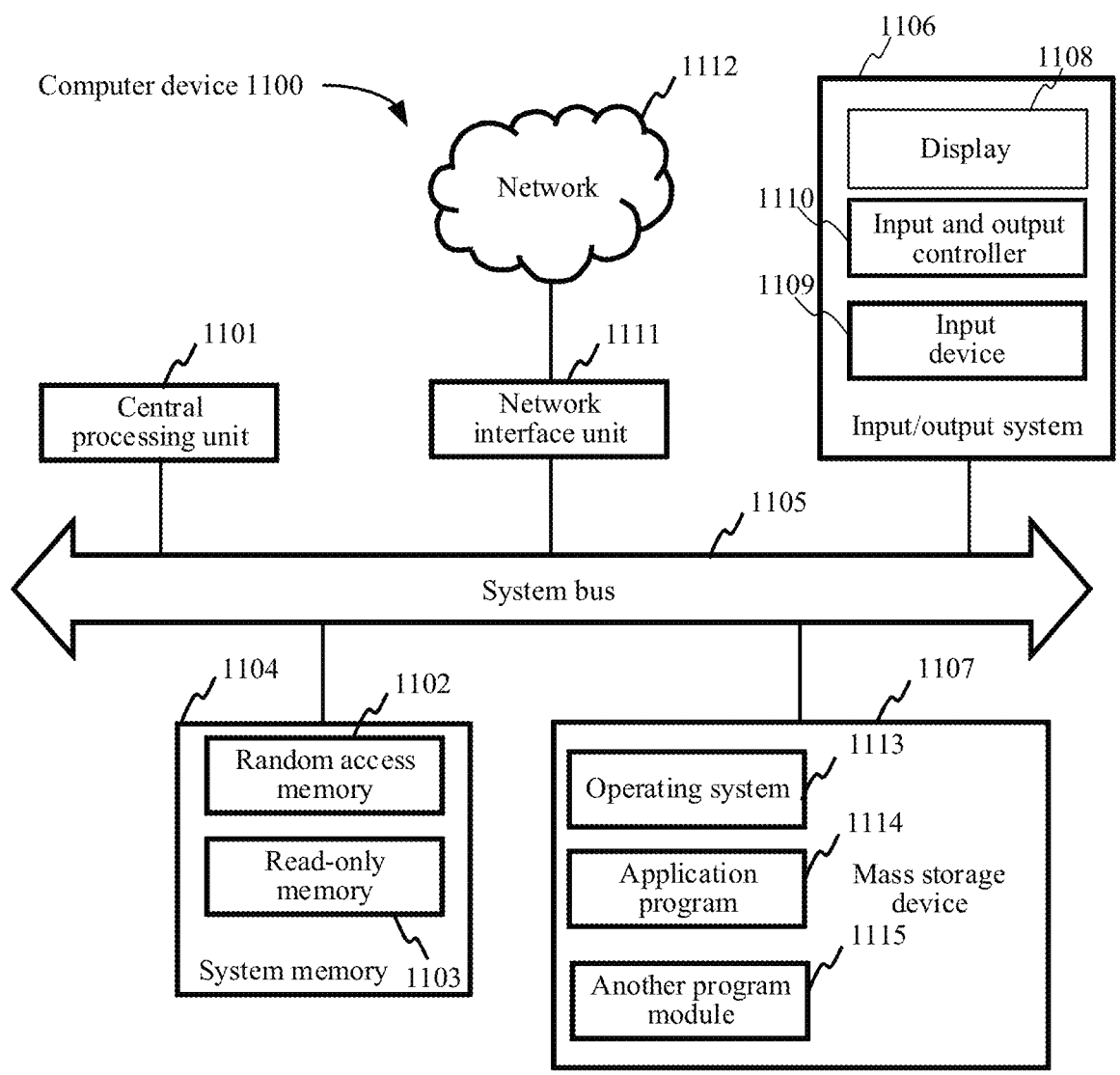
FIG. 11 is a schematic structural diagram of a computer device according to some embodiments.

FIG. 11 is a schematic structural diagram of a computer device according to some embodiments. The computer device may be any electronic device with a data computing function, a data processing function and a data storage function, for example, a personal computer (PC), a server, or the like. The computer device is configured to perform the image gaze correction method and the method for training a gaze correction model according to some embodiments.

The computer device 1100 includes a processing unit 1101 (such as a central processing unit (CPU), a graphics processing unit (GPU), and a field programmable gate array (FPGA), a system memory 1104 including a random-access memory 1102 (RAM) and a read-only memory 1103, and a system bus 1105 connecting the system memory 1104 and the central processing unit 1101. The computer device 1100 further includes a basic input/output system (I/O system) 1106 configured to transmit information between components in the server, and a mass storage device 1107 configured to store an operating system 1113, an application program 1114, and another program module 1115.

The basic I/O system 1106 includes a display 1108 configured to display information and an input device 1109, such as a mouse or a keyboard, configured to input information for a user. The display 1108 and the input device 1109 are both connected to the CPU 1101 by using an input/output controller 1110 connected to the system bus 1105. The basic I/O system 1106 may further include the I/O controller 1110 configured to receive and process inputs from a plurality of other devices such as a keyboard, a mouse, or an electronic stylus. In some embodiments, the input/output controller 1110 further provides output to a display screen, a printer, or other types of output devices.

The mass storage device 1107 is connected to the CPU 1101 by using a large-capacity storage controller (not shown) connected to the system bus 1105. The mass storage device 1107 and an associated computer-readable medium provide non-volatile storage for the computer device 1100. That is, the mass storage device 1107 may include a computer-readable storage medium (in FIG. 11 not shown) such as a hard disk or a compact disc read-only memory (CD-ROM) drive.

In some embodiments, the non-transitory computer-readable storage medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer-readable storage medium includes a RAM, a ROM, an erasable programmable ROM (EPROM), an electrically erasable programmable ROM (EEPROM), a flash memory or another solid-state memory technology, CD-ROM, a digital versatile disc (DVD) or another optical memory, a tape cartridge, a magnetic cassette, a magnetic disk memory, or another magnetic storage device. Certainly, a person skilled in the art can know that the computer-readable storage medium is not limited to the foregoing several types. The foregoing system memory 1104 and mass storage device 1107 may be collectively referred to as a memory.

According to some embodiments, the computer device 1100 may further be connected, through a network such as the Internet, to a remote computer on the network. That is, the computer device 1100 may be connected to a network 1112 by using a network interface unit 1111 connected to the system bus 1105, or may be connected to another type of network or a remote computer system by using a network interface unit 1111.

The memory further includes at least one instruction, at least one program, a code set, or an instruction set. The at least one instruction, the at least one program, the code set, or the instruction set is stored in the memory and is configured to be executed by one or more processors to implement the image gaze correction method or the method for training a gaze correction model provided in some embodiments.

In some embodiments, a computer-readable storage medium is further provided, the computer-readable storage medium storing at least one instruction, at least one program, a code set or an instruction set, and the at least one instruction, the at least one program, the code set or the instruction set being executed by a processor of the computer device to implement the image gaze correction method or the method for training a gaze correction model provided in some embodiments.

In some embodiments, the computer-readable storage medium may include: a ROM, a RAM, a solid state drive (SSD), an optical disc, or the like. The RAM may include a resistance random access memory (ReRAM) and a dynamic random access memory (DRAM).

In some embodiments, a computer program product or a computer program is further provided, the computer program product or the computer program including computer instructions, the computer instructions being stored in a computer-readable storage medium. A processor of a computer device (referred to as an electronic device) reads the computer instructions from the computer-readable storage medium, and the processor executes the computer instructions, to cause the computer device to perform the image gaze correction method or the method for training a gaze correction model provided in some embodiments.

It is to be understood that "plurality of" mentioned in this specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the operation numbers described in some embodiments merely schematically show a possible execution sequence of the operations/steps, the operations/steps may not be performed according to the number sequence. For example, two operations with different numbers may be performed simultaneously, or two operations with different numbers may be performed according to a sequence contrary to the sequence shown in the figure. This is not limited herein.

The foregoing descriptions are merely examples of some embodiments, but are not intended to limit the disclosure. Any modification, equivalent replacement, or improvement made without departing from the spirit and principle of the disclosure should fall within the protection scope of the disclosure.

What is claimed is:

1. A method comprising:
acquiring, by a computing device, a to-be-corrected eye image from a to-be-corrected image;
generating, by the computing device and based on the to-be-corrected eye image, an eye motion flow field comprising a first plurality of pixels and an eye contour mask comprising a second plurality of pixels, wherein each of the first plurality of pixels comprises a horizontal displacement and a vertical displacement and each of the second plurality of pixels indicates a probability that a corresponding pixel in the to-be-corrected eye image belongs to an eye region;
performing, by the computing device and based on the eye motion flow field and the eye contour mask, gaze correction processing on the to-be-corrected eye image to obtain a corrected eye image, the gaze correction processing comprising:
performing, using the eye motion flow field, transformation processing on the to-be-corrected eye image to obtain an initially corrected eye image;
performing, using the eye contour mask, adjustment processing on the initially corrected eye image to obtain a further corrected eye image, wherein the adjustment processing comprises fusing pixel values of corresponding positions in the eye contour mask and the initially corrected eye image to obtain a first intermediate image; and
generating, by the computing device, a gaze corrected image based on the corrected eye image.

2. The method according to claim 1, wherein the gaze correction processing further comprises:
determining the further corrected eye image as the corrected eye image.

3. The method according to claim 2, wherein the adjustment processing further comprises:
fusing pixel values of corresponding positions in a mapped image corresponding to the eye contour mask and the to-be-corrected eye image to obtain a second intermediate image; and
integrating pixel values of corresponding positions in the first intermediate image and the second intermediate image to obtain the further corrected eye image.

4. The method according to claim 1, further comprising:
performing down-sampling processing on the to-be-corrected eye image to generate a down-sampled image; and
performing up-sampling processing on the down-sampled image to obtain the eye motion flow field and the eye contour mask, wherein during the up-sampling processing, a feature map generated by the up-sampling processing and a feature map of a same size generated during the down-sampling processing are cascaded and then used as an input image of a next up-sampling operation.

5. The method according to claim 4, wherein the down-sampling processing and the up-sampling processing are implemented by a gaze correction model, the eye motion flow field is data of a first channel and a second channel output data of the gaze correction model, and the eye contour mask is data of a third channel in the output data.

6. The method according to claim 1, wherein the acquiring comprises:

recognizing contour key points of eyes from the to-be-corrected image;

determining a minimum circumscribed rectangle based on the contour key points;

specifying a multiple for extension of the minimum circumscribed rectangle to obtain an image capture frame; and capturing, based on the image capture frame, the to-be-corrected eye image from the to-be-corrected image.

7. The method according to claim 1, wherein the generating the gaze corrected image comprises:

integrating the corrected eye image into an image capture frame position of the to-be-corrected image to obtain an integrated image, wherein the image capture frame position is a position of the to-be-corrected eye image in the to-be-corrected image; and performing image harmonization processing at the image capture frame position in the integrated image to obtain the gaze corrected image, wherein the image harmonization processing is used for eliminating boundary traces at the image capture frame position.

8. The method according to claim 7, wherein the performing image harmonization processing at the image capture frame position in the integrated image comprises:

generating an initialized mask image of a same size as the to-be-corrected image, wherein a pixel value of the initialized mask image at the image capture frame position is a first specified value, pixel values of remaining positions are a second specified value different from the first specified value, and the remaining positions are positions in the initialized mask image except the image capture frame position;

performing noise processing on the initialized mask image to obtain a processed mask image;

fusing pixel values of corresponding positions in the processed mask image and the integrated image to obtain a first generated image;

fusing pixel values of corresponding positions in a mapped image corresponding to the processed mask image and the to-be-corrected image to obtain a second generated image; and integrating pixel values of corresponding positions in the first generated image and the second generated image to obtain the gaze corrected image.

9. An apparatus comprising:

one or more processors; and memory storing computer-readable instructions that when executed by the one or more processors, cause the apparatus to:

acquire a to-be-corrected eye image from a to-be-corrected image;

generate, based on the to-be-corrected eye image, an eye motion flow field comprising a first plurality of pixels and an eye contour mask comprising a second plurality of pixels, wherein each of the first plurality of pixels comprises a horizontal displacement and a vertical displacement, and each of the second plurality of pixels indicates a probability that a corresponding pixel in the to-be-corrected eye image belongs to an eye region;

perform, based on the eye motion flow field and the eye contour mask, gaze correction processing on the to-be-corrected eye image to obtain a corrected eye image, the gaze correction processing comprising:

performing, using the eye motion flow field, transformation processing on the to-be-corrected eye image to obtain an initially corrected eye image;

performing, using the eye contour mask, adjustment processing on the initially corrected eye image to obtain a further corrected eye image, wherein the adjustment processing comprises fusing pixel values of corresponding positions in the eye contour mask and the initially corrected eye image to obtain a first intermediate image; and generate a gaze corrected image based on the corrected eye image.

10. The apparatus according to claim 9, wherein the gaze correction processing further comprises:

determining the further corrected eye image as the corrected eye image.

11. The apparatus according to claim 10, wherein the adjustment processing further comprises:

fusing pixel values of corresponding positions in a mapped image corresponding to the eye contour mask and the to-be-corrected eye image to obtain a second intermediate image; and integrating pixel values of corresponding positions in the first intermediate image and the second intermediate image to obtain the further corrected eye image.

12. The apparatus according to claim 9, the memory storing computer-readable instructions that when executed by the one or more processors, further cause the apparatus to:

perform down-sampling processing on the to-be-corrected eye image to generate a down-sampled image; and perform up-sampling processing on the down-sampled image to obtain the eye motion flow field and the eye contour mask, wherein during the up-sampling processing, a feature map generated by the up-sampling processing and a feature map of a same size generated during the down-sampling processing are cascaded and then used as an input image of a next up-sampling operation.

13. The apparatus according to claim 12, wherein the down-sampling processing and the up-sampling processing are implemented by a gaze correction model, the eye motion flow field is data of a first channel and a second channel in output data of the gaze correction model, and the eye contour mask is data of a third channel in the output data.

14. The apparatus according to claim 9, the memory storing computer-readable instructions that when executed by the one or more processors, further cause the apparatus to:

recognize contour key points of eyes from the to-be-corrected image;

determine a minimum circumscribed rectangle based on the contour key points;

specify a multiple for extension of the minimum circumscribed rectangle to obtain an image capture frame; and capture, based on the image capture frame, the to-be-corrected eye image from the to-be-corrected image.

15. The apparatus according to claim 9, the memory storing computer-readable instructions that when executed by the one or more processors, further cause the apparatus to:

integrate the corrected eye image into an image capture frame position of the to-be-corrected image to obtain an integrated image, wherein the image capture frame position is a position of the to-be-corrected eye image in the to-be-corrected image; and perform image harmonization processing at the image capture frame position in the integrated image to obtain the gaze corrected image, wherein the image harmonization processing is used for eliminating boundary traces at the image capture frame position.

16. The apparatus according to claim 15, wherein the performing image harmonization processing at the image capture frame position in the integrated image comprises:
generating an initialized mask image of a same size as the to-be-corrected image, wherein a pixel value of the initialized mask image at the image capture frame position is a first specified value, pixel values of remaining positions are a second specified value different from the first specified value, and the remaining positions are positions in the initialized mask image except the image capture frame position;
performing noise processing on the initialized mask image to obtain a processed mask image;
fusing pixel values of corresponding positions in the processed mask image and the integrated image to obtain a first generated image;
fusing pixel values of corresponding positions in a mapped image corresponding to the processed mask image and the to-be-corrected image to obtain a second generated image; and
integrating pixel values of corresponding positions in the first generated image and the second generated image to obtain the gaze corrected image.

17. A non-transitory computer-readable storage medium, storing computer-readable instructions that when executed by at least one processor causes the at least one processor to:
acquire a to-be-corrected eye image from a to-be-corrected image;
generate, based on the to-be-corrected eye image, an eye motion flow field comprising a first plurality of pixels and an eye contour mask comprising a second plurality of pixels, wherein each of the first plurality of pixels comprises a horizontal displacement and a vertical displacement, and each of the second plurality of pixels indicates a probability that a corresponding pixel in the to-be-corrected eye image belongs to an eye region;
perform, based on the eye motion flow field and the eye contour mask, gaze correction processing on the to-be-corrected eye image to obtain a corrected eye image, the gaze correction processing comprising:
performing, using the eye motion flow field, transformation processing on the to-be-corrected eye image to obtain an initially corrected eye image;
performing, using the eye contour mask, adjustment processing on the initially corrected eye image to obtain a further corrected eye image, wherein the adjustment processing comprises fusing pixel values of corresponding positions in the eye contour mask and the initially corrected eye image to obtain a first intermediate image; and
generate a gaze corrected image based on the corrected eye image.

18. The non-transitory computer-readable storage medium according to claim 17, wherein the gaze correction processing further comprises:
determining the further corrected eye image as the corrected eye image.

19. The non-transitory computer-readable storage medium according to claim 18, wherein the adjustment processing further comprises:
fusing pixel values of corresponding positions in a mapped image corresponding to the eye contour mask and the to-be-corrected eye image to obtain a second intermediate image; and
integrating pixel values of corresponding positions in the first intermediate image and the second intermediate image to obtain the further corrected eye image.

20. The non-transitory computer-readable storage medium according to claim 17, further storing computer-readable instructions that when executed by at least one processor causes the at least one processor to:
perform down-sampling processing on the to-be-corrected eye image to generate a down-sampled image; and
perform up-sampling processing on the down-sampled image to obtain the eye motion flow field and the eye contour mask, wherein during the up-sampling processing, a feature map generated by the up-sampling and a feature map of a same size generated during the down-sampling processing are cascaded and then used as an input image of a next up-sampling operation.

* * * * *